Oct. 11, 1949.

E. A. HAWK 2,484,506

APPARATUS FOR MEASURING AND
CONTROLLING PUG MILL OUTPUT

Filed June 10, 1946

INVENTOR.
Elwin A. Hawk
BY
Frease and Bisley
ATTORNEYS

Patented Oct. 11, 1949

2,484,506

UNITED STATES PATENT OFFICE 2,484,506

APPARATUS FOR MEASURING AND CONTROLLING PUG MILL OUTPUT

Elwin A. Hawk, East Rochester, Ohio

Application June 10, 1946, Serial No. 675,814

7 Claims. (Cl. 25—11)

The invention relates to methods and apparatus for measuring and controlling pug mill output, and more particularly to methods and apparatus for measuring the volume, weight, and velocity of flow of a stream or moving column of green ceramic or other plastic material.

In the manufacture of clay products, a pug mill is usually used for effecting the final conditioning before forming of the ceramic body composition made up predominately of clay, by thorough mixing and compression, and by proper tempering by addition of water; and the pugging is frequently performed under vacuum or sub-atmospheric pressure.

The output of the pug mill is usually in the form of a moving solid green ceramic column or stream which is subject to the subsequent forming operations, which for example may be the cutting off of slugs from the moving green ceramic column and the conveying of the slugs to a repressing machine for forming repressed brick from the slugs.

In another example, the subsequent forming operation may be automatic jiggering of dishes including plates and saucers, and in such instance the proper operation of the automatic jiggering machine may require the direct flow of a stream or moving column of a green ceramic body from the pug mill into the automatic jiggering machine.

In each of the above examples, the repressing machine or the automatic jiggering machine is usually intended to be operated to produce a constant number of the repressed brick or formed dishes per revolution of the main drive shaft of the repressing machine or the jiggering machine.

It is impossible however to provide for the desired constant rate of production of formed ceramic articles from a repressing machine or an automatic jiggering machine, if the machine is supplied from a pug mill having a variable output, and usual methods of operating a pug mill have been such prior to the present invention as to result in a variable output of the pug mill.

It is desirable therefore in the operation of a pug mill to be able to measure its output, and to control its output.

The objects of the present invention therefore include the provision of methods and apparatus for measuring the volume, weight, and velocity of flow of a stream of plastic material such as the green ceramic output column of a pug mill.

Further objects of the present invention include the provision of methods and apparatus for controlling or varying the flow of such a stream of plastic material, as the result of such measuring.

Further objects of the present invention include the provision of such apparatus for measuring and controlling the flow of a stream of plastic material, in which the parts are of simplified construction and arrangement, whereby the parts may be rapidly and economically manufactured, and easily and correctly assembled and disassembled, so that the apparatus may be economically produced and maintained.

The foregoing and other objects are attained by the plastic stream or moving column flow measuring and controlling methods and apparatus, parts, combinations, and sub-combinations which comprise the present invention, and the natures of which are set forth in the following general statement, and preferred steps and embodiments of which are set forth in the following description, and which are particularly and distinctly pointed out and set forth in the appended claims forming part hereof.

The nature of the improved methods of the present invention may be stated in general terms as including producing a stream or moving column of plastic material which has a varying flow, continuously measuring with respect to volume, weight, and velocity, the flow of the stream or moving column of plastic material, and varying the rate of flow of the stream or moving column of plastic material with respect to the rate of flow during a previous defined period or interval of time.

The nature of the improved apparatus for carrying out the improved methods of the present invention may be stated in general terms as including means for producing a stream or moving column of plastic material and causing the stream or column to flow through a restricted opening having a defined cross-sectional area, propeller means having blades adjacent the restricted opening and in the path of and intercepting substantially the entire transverse cross-sectional area of the stream or moving column of plastic material as it flows into the restricted opening, preferably means operated by the propeller means for indicating the rotational movement of the propeller blades preferably by cumulatively counting their revolutions over defined periods or intervals of time, and means actuated by operation of the propeller means for varying the rate of flow of the stream or moving column of plastic material after the operation of the propeller means during a previous defined period or interval of time.

By way of example, preferred embodiments of the improved plastic stream or moving column flow measuring and controlling apparatus of the present invention and of improved parts thereof are illustrated in the accompanying drawings forming part hereof, in which.

Similar numerals refer to similar parts throughout the drawings.

Figure 1:
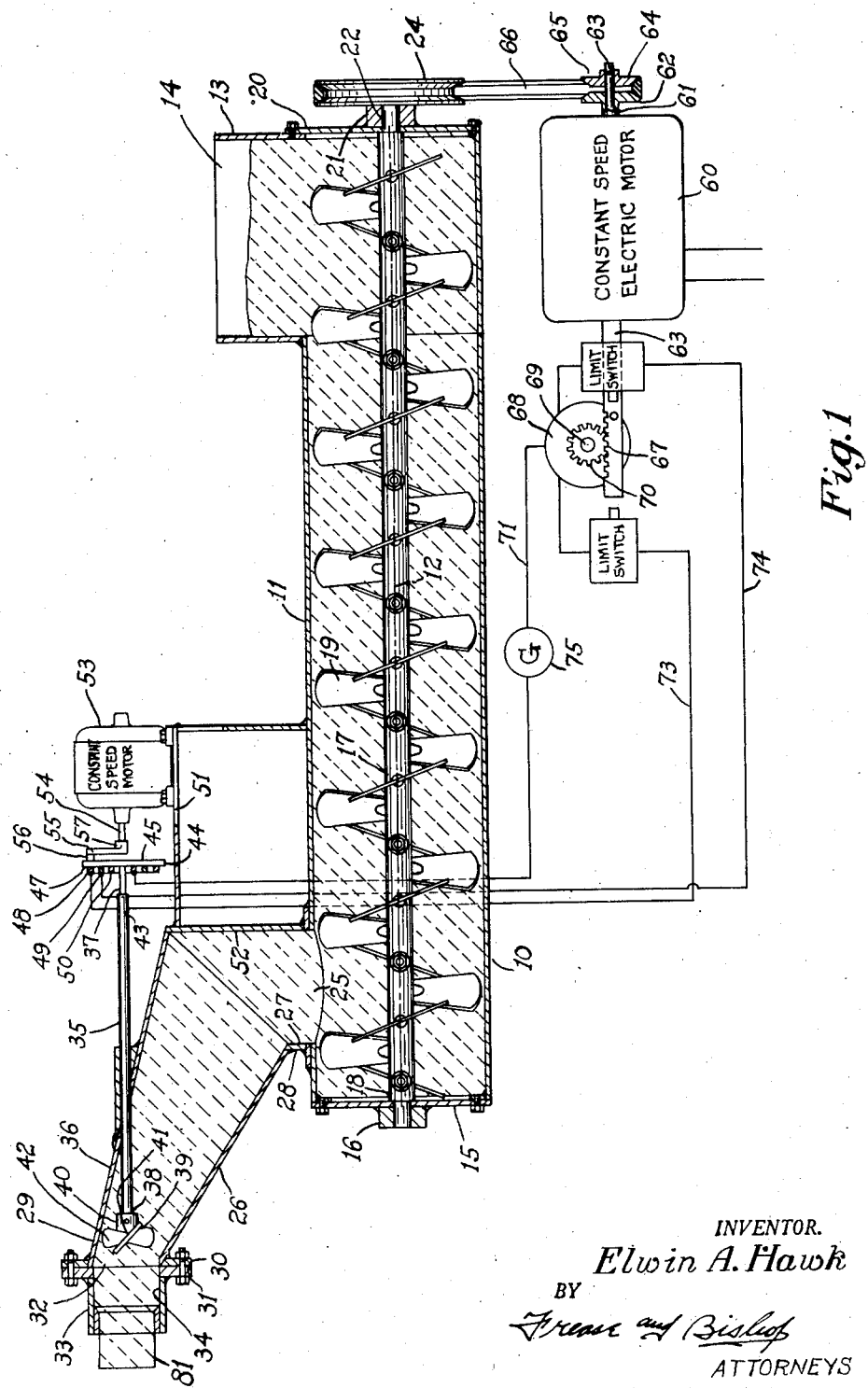
Figure 1 is a side elevational view, diagrammatic in part showing one embodiment of the improved apparatus in the form of an improved pug mill adapted for measuring and controlling its output.
Figure 2:
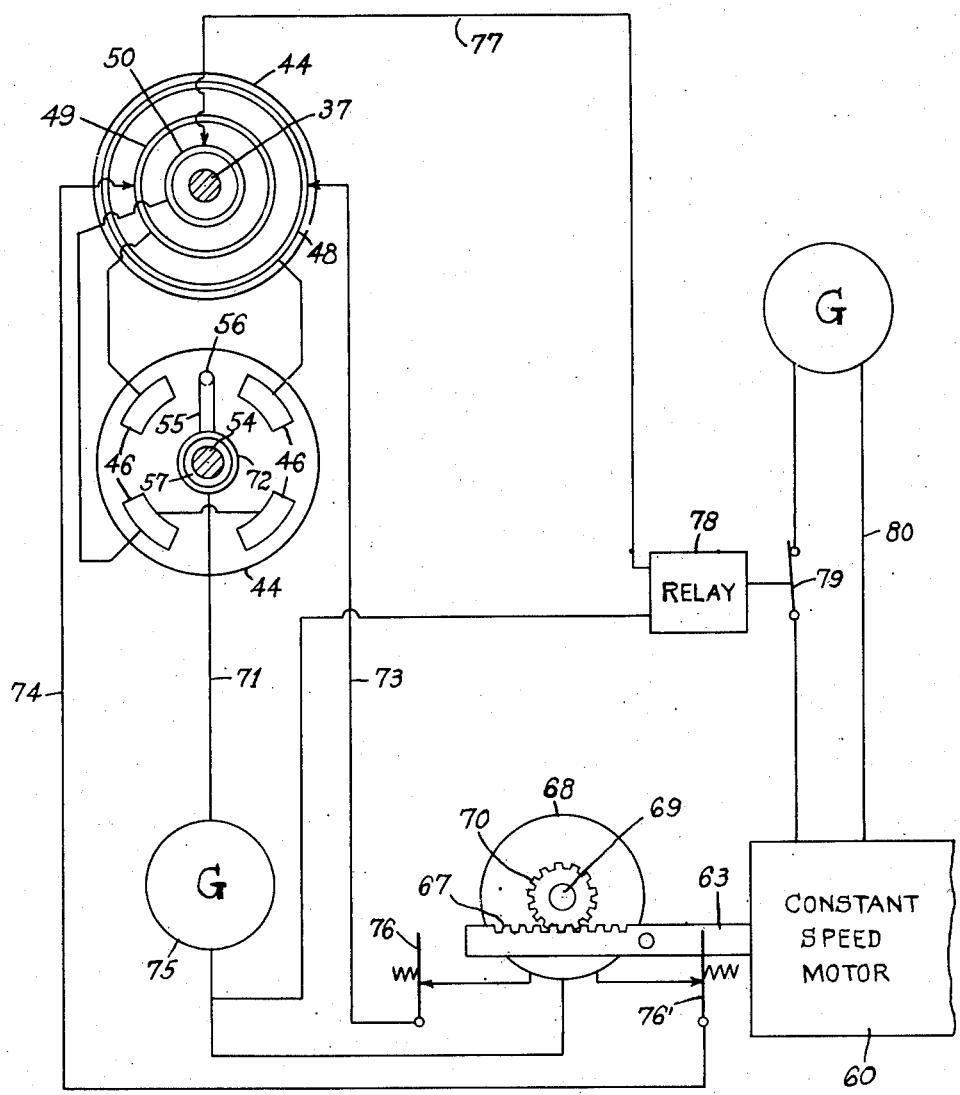
Fig. 2 is a diagrammatic view illustrating electrical parts of the improved apparatus.

The embodiment of the improved plastic stream or moving column flow measuring and controlling apparatus of the present invention illustrated in Figs. 1 and 2 is in the form of an improved pug mill indicated generally by 10 including an elongated tube or barrel 11 whose longitudinal axis 12 as shown is horizontal. At one end of the tube 11 there is communicatingly connected in a usual manner walls forming an intake hopper 13, the upper ends of the vertical walls of which terminate at and form an upper intake opening 14.

The other end of the tube 11 has a closure wall 15 on which is centrally mounted bearing means 16 of any desired usual construction, and the improved pug mill 10 furthermore includes a longitudinally extending main shaft 17 which as shown is coaxial with the longitudinal axis 12 of the tube 11, the shaft 17 extending through the hopper 13 and the tube 11, and the end 18 of the shaft 17 within the tube 11 is journaled in the bearing means 16. Within the tube 11, the main shaft 17 has operatively mounted thereon in a usual manner pug and feed screw blades 19, each of which extends radially outwardly from the shaft 17, and the blades 19 are also suitably angled with respect to each other to comprise helicoidal screw faces about the shaft 17.

The hopper 13 includes an end wall 20 opposite the tube end wall 15, and bearing means 21 are mounted on the hopper end wall 20, and the shaft 17 extends through the bearing means 21 and terminates in an end 22 outside the hopper end wall 20 where driven pulley means 24 are secured.

As thus far described, the pug mill 10 is of usual construction excepting for the end closure wall 15 for the tube 11, which in usual pug mill construction is not a closure wall, but is provided with a central opening communicating with an output column forming die.

For the purposes of the present improvements, in addition to providing the end closure wall 15 for the tube 11, adjacent the end closure wall 15 one side of the tube 11, as shown the top side, has formed therein a side opening 25, and walls form an elbow conduit 26 having one end opening 27 registering with the side opening 25 of the tube 11, and wall end portions 28 of the elbow conduit 26 at the end opening 27 are preferably seal connected with the tube 11.

A transverse cross section of the elbow conduit wall end portions 28 is, as shown, horizontal, and the other wall end portions 29 of the elbow conduit 26 terminate in a connector flange 30 having an outer vertical face 31 and an opening 32 whose transverse cross section is vertical and thus at right angles to the transverse cross section of the elbow conduit wall end portions 28.

The elbow conduit connector flange 30 as shown is connected with an output column forming die 33 which may be cylindric and have a cylindric bore opening 34 the diameter of which is equal to or smaller than the diameter of the preferably circular opening 32 of the elbow conduit connector flange 30. Whatever may be the cross sectional shape of the openings 32 and the bore 34, the area of each for the purposes of the present improvements is less than the area of the registering tube upper side opening 25 and elbow conduit opening 27. Thus the other elbow conduit opening 32, either in itself or in combination with the bore 34 of the output die 33, constitutes a restricted output opening for the pug mill 10, and the output opening is laterally offset from the longitudinal axis 12 of the pug mill.

Further for the purpose of the present improvements, a bearing tube 35 extends through an upper sloping wall 36 of the elbow conduit 26, and a shaft 37 is journaled in the bearing tube 35, the shaft 37 extending beyond the end 38 of the bearing tube 35 within the elbow conduit 26 adjacent the restricted opening 32, where the inner end of the shaft 37 has mounted thereon a propeller 39 including a hub 40 from which a plurality of propeller blades 41 extend radially with respect to the axis of rotation of the shaft 37 and each propeller blade being preferably equal in length and having equal area working faces 42 angled similarly with respect to each other and with respect to their axis of rotation. The length of each propeller blade 41 is such that the overall propeller diameter is very nearly that of the diameter of the restricted opening 32.

The other end of the shaft 37 beyond the outer end 43 of the bearing tube 35 has secured thereon a circular disc 44 preferably made of insulating material, and in the outer face 45 of the disc 44 are embedded a plurality of conductor segments each indicated by 46, and which are four in number as shown, and which are equal in arcuate length and equally spaced from each other arcuately as shown in Fig. 2.

On the inner face 47 of the disc 44 are located three concentric circular collector rings 48, 49, and 50 of conducting material. Two of the adjacent conductor segments 46 are electrically connected respectively with the outer and intermediate collector rings 48 and 49, and the other two segments 46 are each electrically connected with the inner collector ring 50. The collector rings 48, 49, and 50 are included in electrical circuits which will be hereinafter described.

Further for the purposes of the present improvements, a bracket 51 extends from a rear vertical wall 52 of the elbow conduit 26 below the disc 44, and the bracket 51 has mounted thereon beyond the outer face 45 of the disc 44 a constant speed electric motor or electric motor and reducing gear combination indicated generally by 53, and including an output shaft 54 extending towards and being coaxial with the shaft 37 and disc 44, the outerface 45 of the disc 44 being perpendicular with the axis of the shafts 37 and 54.

Adjacent the outer face 45 of the disc 44 which may be broadly termed "a first rotary member," the outer end of the shaft 54 has mounted thereon a radially extending contact arm 55 having an outer contact finger 56 located in abutment against the outer face 45 of the disc 44 at the same radial distance from the axis of rotation of the shafts 54 and 37 as are the conductor segments 46. The arm 55 may be broadly termed "a second rotary member."

The hub 57 of the contact arm 55 on the shaft 54 is in the form of a collector ring and is included in electrical circuits hereinafter described. The contact arm 55 and its finger 56 and hub 57 are of conducting material and are insulated from the shaft 54.

Further for the purposes of the present improvements, variable speed drive means is provided for the pug mill 10, which as shown include a constant speed electric drive motor 60 combined with a variable speed transmission, which as shown includes a tubular shaft 61 for the motor 60 which is part of a variable speed belt transmission including a conical half V-pulley 62 secured on the tubular shaft 61, and the tubular shaft 61, being longitudinally immovable. Within the tubular shaft 61 is keyed a longitudinally slidable shaft 63 which extends beyond opposite ends of the motor 60 and the conical half V-pulley 62. On the end of the shaft 63 adjacent the conical half V-pulley 62 there is secured a conical half V-pulley 64, the conical half V-pulleys 62 and 64 forming an adjustable V-pulley 65, the effective diameter of the V-groove of which depends upon the spacing of the half V-pulleys 62 and 64 from each other.

The driven pulley means 24 on the pug mill main shaft 17 is also part of the variable speed belt transmission and is a V-groove pulley. An endless V belt 66 extends around and is in driving engagement with the V-groove pulley 24 and the adjustable V-pulley 65. Means not shown are provided in a usual manner for maintaining tension on the belt 66 regardless of the effective diameter of the adjustable V-pulley 65. The variable speed belt transmission thus described between the drive motor 60 and the pug mill main shaft 17 is in general terms a description of a usual variable speed belt transmission means known as the Reeves transmission.

Further for the purposes of the present improvements, means are provided for operating the variable speed belt transmission, which as shown include a rack 67 journaled and retained on the end of the shaft 63 extending beyond the motor 60 towards the output end of the pug mill. A reversing motor 68 is located above the shaft 63 and on one end of the shaft 69 of the reversing motor 68 there is secured a pinion 70 meshed with the rack 67.

Referring to Fig. 2, a conductor 71 has one end connected to a collecting collar 72 in which rotates the collector ring hub 57 of the contact arm 55. The other end of the conductor 71 is connected with the neutral binding post of the reversing motor 68. A second conductor 73 has one end connected to a wiping contact for the outer collector ring 48 and the other end of the conductor 73 is connected with the forward binding post of the motor 68, that is the binding post which will cause rotation of the motor to move the shaft 63 away from the motor 60 in the direction of the motor 68 causing the conical half V-pulleys 62 and 64 to approach more closely together to provide a fast drive for the pug mill shaft 17.

A third conductor 74 has one end connected by a wiping contact with the intermediate collector ring 49, and the other end of the conductor 74 connected to the reverse binding post of the motor 68.

For purposes of illustration the source of power for the electric circuits thus described is shown as including a generator 75 in series in the conductor line 71. When the motor 68 is connected so as to operate in reverse the shaft 63 is moved towards the motor 60 and away from the motor 68 so as to separate the conical half V-pulleys 62 and 64 and produce low speed drive of the pug mill main shaft 17.

As shown in Fig. 2 there is included in series in the conductor line 73 a limit switch 76 actuatable by the shaft 63 to open when moving away from the motor 60 and towards the motor 68, and similarly there is included in the conductor line 74 a limit switch 76' actuated by a stud on the shaft 63 to open when the shaft 63 is moving towards the motor 60 and away from the motor 68, the operation of the limit switches 76 and 76' serving to stop the motor 68 after a predetermined rotation of its shaft 69 and pinion 70 in either direction.

The inner collector ring 50 electrically connected as aforesaid with the two lower segments 46 as shown in Fig. 2 is in a circuit indicated generally by 77 in Fig. 2 including a relay 78 which when energized opens switch 79 in the main power circuit 80 for the motor 60 and thus stops the motor 60.

In the operation of the improved pug mill 10, for example, a setting of the shaft 63 may be initially such as to be midway between its high and low speed settings for the variable speed transmission of which it is a part, and the pug mill main shaft 17 will be driven at an intermediate speed such that normal feeding of material into the pug mill hopper 13, and normal operation of the pug mill main shaft 17 serves to flow a column 81 of plastic material such as clay through the elbow conduit 26 and its opening 32 and the output die 33; and the stream of plastic material flowing through the elbow conduit 26 flows against the propeller blades 41 adjacent the restricted opening 32 and output die 33, causing rotation of the shaft 37 at an intermediate speed dependent on the velocity of the stream of plastic material when the pug mill is operating at a desired rate of normal output of the column 81.

The constant speed electric motor or electric motor and reducing gear combination 53 is operated so that its output shaft 54 has a constant speed the same as the speed of the shaft 37 and disc 44 produced by normal flow of the stream of plastic material against the propeller blades 41 and producing a normal output column 81.

If on the one hand, for example, during operation of the improved pug mill 10 there is a slow down in the feeding of the plastic material into a pug mill hopper 13, the velocity of the output column 81 of plastic material slows down, and the speed of rotation of the shaft 37 decreases. When the pug mill 10 is started so as to produce a normal flow of the output column 81 of the plastic material, the contact arm 55 is initially set as shown in Fig. 2 so as to be between the upper segments 46, and the contact arm 57 and disc 44 while rotating at the same normal speed, maintain this setting of the contact arm 57 between the two upper segments as shown in Fig. 2.

When however the disc 44 on the shaft 37 slows down with respect to the constant speed of the shaft 54 and contact arm 55, the contact finger 56 makes contact with the right hand upper segment 46 as shown in Fig. 2 connected with the conductor 73, thereby energizing the forward winding of the motor 68, and operating the Reeves transmission so as to increase the speed of the pug mill main shaft 17, thereby increasing the velocity of flow of the output column 81 of plastic material and increasing the speed of the disc 44 driven by the propeller 39, and causing a separation of the contact finger 56 from connection with the segment 46 in the forward conductor line 73, and a reversion of the relative positions of the disc 44 and the contact arm 55 to that shown in Fig. 2.

If on the other hand, for example, during operation of the improved pug mill 10 there is a speed up in the flow of plastic material through the barrel 11, such as might be caused by a temporary increase in the water content of clay when clay is being pugged, with a consequent reduction in the resistance to the flow of the clay through the pug mill barrel, the velocity of the output column 81 of plastic material speeds up, and the speed of rotation of the shaft 37 increases. Then the disc 44 on the shaft 37 speeds up with respect to the constant speed of the shaft 54 and contact arm 55, and the contact finger 56 makes contact with the left hand upper segment 46 as shown in Fig. 2 connected with the conductor 74, thereby energizing the reverse winding of the motor 68 and operating the Reeves transmission so as to decrease the speed of the pug mill main shaft 17, thereby decreasing the velocity of flow of the output column 81 of plastic material and decreasing the speed of the disc 44 driven by the propeller 39, and causing a separation of the contact finger 56 from connection with the segment 46 in the reverse conductor line 74, and a reversion of the relative positions of the disc 44 and the contact arm 55 to that shown in Fig. 2.

As above stated the operation of the limit switches 76 and 76' serves to stop the motor 68 at the maximum and minimum speeds of the Reeves transmission. Between these maximum and minimum speeds, in the operation of the improved pug mill 10 as above set forth, the speed of rotation of the pug mill main shaft 17 is controlled by changes in the velocity of flow of the output column 81 of plastic material. After a slowing down from the normal velocity of the output column 81 of plastic material for a predetermined period of time, the speed of rotation of the pug mill main shaft 17 is automatically increased. Conversely after a speeding up of the velocity of the output column 81 of plastic material from the normal for a predetermined period of time, the speed of rotation of the pug mill main shaft 17 is automatically decreased.

Figure 3:
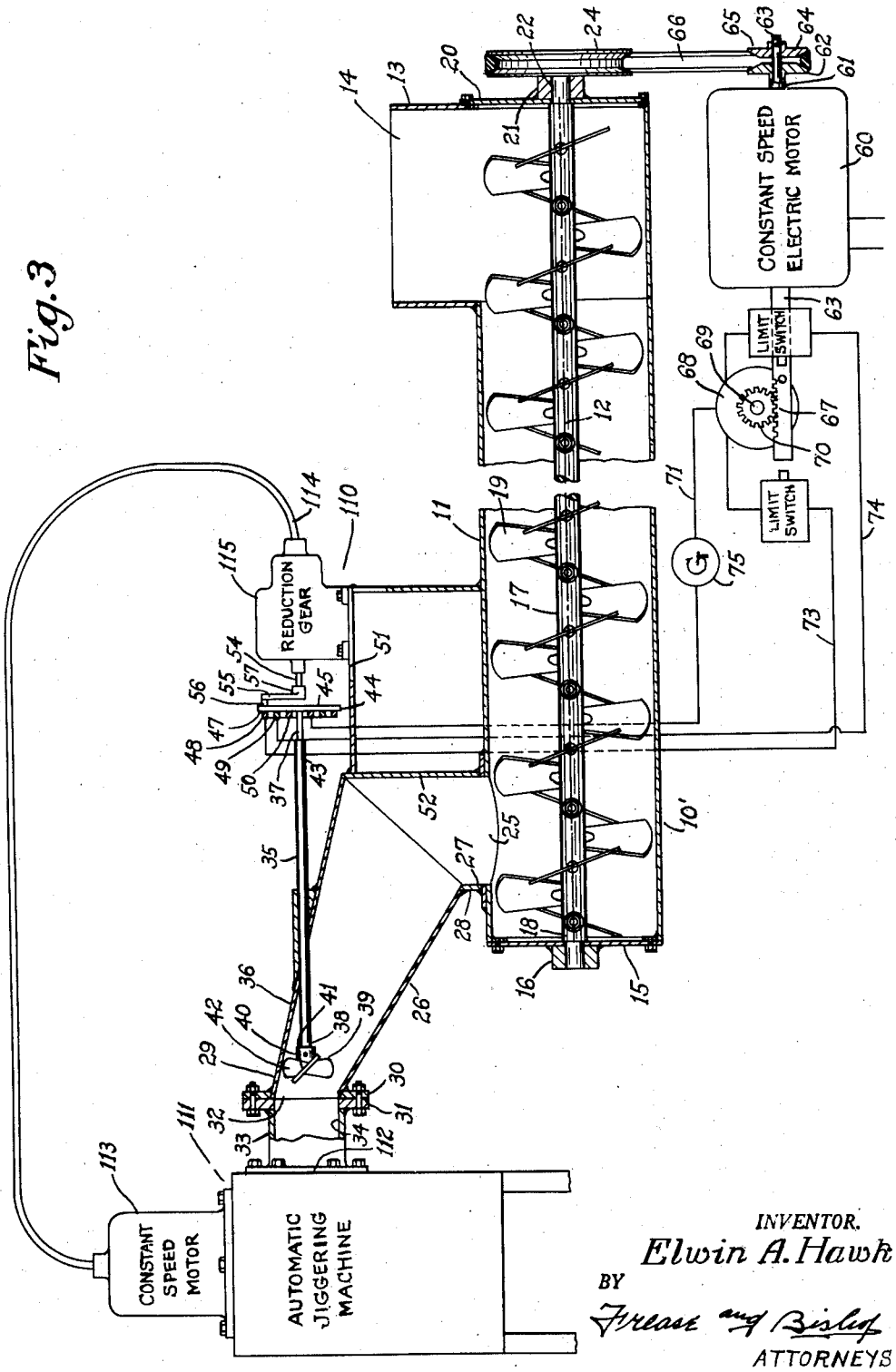
Fig. 3 is a view similar to Fig. 1 showing a second embodiment of the improved apparatus including an improved pug mill combined with an automatic jiggering machine, and the output of the pig mill being measured and controlled in coordination with the operation of the jiggering machine.

In Fig. 3 is shown a second embodiment of the improved apparatus indicated generally by 110 including an improved pug mill indicated generally by 10', combined with an automatic jiggering machine indicated generally by 111. The improved pug mill 10' includes parts identical with the parts of the improved pug mill 10 with the exceptions hereinafter set forth.

The output die 33 of the pug mill 10' is directly connected with the input opening 112 of the automatic jiggering machine 111, which has a constant speed drive motor 113.

In the pug mill 10' the shaft 54 on which is secured the contact arm 55 is driven through a flexible shaft 114 and reduction gear 115 by the constant speed drive motor 113 of the automatic jiggering machine 111. Thus the output of the pug mill 10' is automatically controlled by the constant operating speed and input requirements of the automatic jiggering machine 111, the operation of the apparatus combination 110 differing from the operation of the improved pug mill 10 only in the fact that the constant speed shaft 54 on the pug mill 10' of the apparatus combination 110 is driven as above set forth by the constant speed motor 113 of the automatic jiggering machine 111 through the reduction gearing 115 and the flexible shaft 114, instead of by the electric motor or electric motor and reducing gear combination 53 of the pug mill apparatus 10.

Further describing the operation of the improved pug mill apparatus 10, it is to be noted that during any defined period of time, regardless of the velocity of the output column 81 of plastic or flowing material, the cumulative rotational displacement of the disc 44 from a reference point is a direct measure of the length of the column flowing through the plane of flow measurement or extrusion plane, that is, the constant transverse area of the restricted opening 32, which is at right angles to the longitudinal direction of movement of the column through the cylindric bore opening 34 of the output column forming die 33.

On the other hand, the constant speed of rotation of the contact arm 55 in the pug mill 10 constitutes means directly measuring the period of time by relation with the disc 44 during which any particular length of column flows through the plane of flow measurement.

Synchronous rotation of the disc 44 and the arm 55 from an initial setting as shown in Fig. 2 indicates constant velocity in the output column 81. Non-synchronous rotations of the disc 44 and the arm 55 indicates increases or decreases in the velocity of the output column 81.

In some instances it may be desirable to provide non-constant speeds of rotation for the contact arm 55 which would be subject to cyclic variations, with which it would be desired to synchronize the rotation of the disc 44.

From a broad standpoint, regardless of the character of the angular velocities of the contact arm 55 and the disc 44, the apparatus 10 operates to synchronize the respective rotations of the arm 55 and disc 44 by varying the velocity of the stream of flowing material operating the propeller 39, through the automatic operation of the variable speed drive means for the pug mill main shaft 17.

The embodiments of the present improvements illustrated and described herein are by way of example, and the scope of the present invention is not limited to the same or to the particular details thereof, but is commensurate with any and all subject matter contained herein which may at any time properly under the patent laws be set forth in the claims hereof or originating herein, and the elements of any such claims are intended to include their reasonable structural and functional equivalents.

I claim:

1. In plastic material manufacture, walls forming a chamber for treatment of plastic material, some of the walls forming a restricted output opening, means operating in the chamber for extruding a flowing column of plastic material through the restricted opening, propeller means having blades adjacent the restricted opening and in the path of and intercepting the flowing column of plastic material, a first rotary member operated by the propeller means, a second rotary member spaced from and coaxial with the first rotary member, and means for driving the second rotary member at a constant speed.

2. In plastic material manufacture, walls forming a chamber for treatment of plastic material, some of the walls forming a restricted output opening, means operating in the chamber for extruding a flowing column of plastic material through the restricted opening, propeller means having blades adjacent the restricted opening and in the path of and intercepting the flowing column of plastic material, a first rotary member operated by the propeller means, a second rotary member spaced from and coaxial with the first rotary member, means for driving the second rotary member at a constant speed, means for varying the flow of the column through the restricted opening, and means actuated by rotational speed differentials between the first and second rotary members for operating the column flow varying means.

3. In plastic material manufacture, walls forming a chamber for treatment of plastic material, some of the walls forming a restricted output opening, means operating in the chamber for extruding a flowing column of plastic material through the restricted opening, propeller means having blades adjacent the restricted opening and in the path of and intercepting the flowing column of plastic material, a first rotary member operated by the propeller means, a second rotary member spaced from and coaxial with the first rotary member, means for driving the second rotary member at a constant speed, means for varying the flow of the column through the restricted opening, and means actuated by rotational speed differentials between the first and second rotary members for operating the column flow varying means, the means for operating the column flow varying means including an electric circuit having a wiping contact piece on the first rotary member and a contact finger on the second rotary member, the contact piece being adapted for wiping over the contact finger when the first and second rotary members have different rotary speeds.

4. In plastic material manufacture, walls forming a chamber for treatment of plastic material, some of the walls forming a restricted output opening, means operating in the chamber for extruding a flowing column of plastic material through the restricted opening, propeller means having blades adjacent the restricted opening and in the path of and intercepting the flowing column of plastic material, a first rotary member operated by the propeller means, a second rotary member spaced from and coaxial with the first rotary member, means for driving the second rotary member at a constant speed, means for varying the flow of the column through the restricted opening, and means actuated by rotational speed differentials between the first and second rotary members for operating the column flow varying means, the means for operating the column flow varying means including an electric circuit having a wiping contact piece on the first rotary member and a contact finger on the second rotary member, the contact piece being adapted for wiping over the contact finger when the first and second rotary members have different rotary speeds, and the electric circuit including a source of power and an electric motor.

5. In plastic material manufacture, walls forming a chamber for treatment of plastic material, some of the walls forming a restricted output opening, means operating in the chamber for extruding a flowing column of plastic material through the restricted opening, propeller means having blades adjacent the restricted opening and in the path of and intercepting the flowing column of plastic material, a first rotary member operated by the propeller means, a second rotary member spaced from and coaxial with the first rotary member, means for driving the second rotary member at a constant speed, means for varying the flow of the column through the restricted opening, and means actuated by rotational speed differentials between the first and second rotary members for operating the column flow varying means, the means for operating the column flow varying means including an electric circuit having two circumferentially spaced wiping contact pieces on the first rotary member and a contact finger on the second rotary member, each contact piece being adapted for wiping over the contact finger when the first and second rotary members have different rotary speeds.

6. In plastic material manufacture, walls forming a chamber for treatment of plastic material, some of the walls forming a restricted output opening, means operating in the chamber for extruding a flowing column of plastic material through the restricted opening, propeller means having blades adjacent the restricted opening and in the path of and intercepting the flowing column of plastic material, a first rotary member operated by the propeller means, a second rotary member spaced from and coaxial with the first rotary member, means for driving the second rotary member at a constant speed, means for varying the flow of the column through the restricted opening, and means actuated by rotational speed differentials between the first and second rotary members for operating the column flow varying means, the means for operating the column flow varying means including an electric circuit having two circumferentially spaced wiping contact pieces on the first rotary member and a contact finger on the second rotary member, each contact piece being adapted for wiping over the contact finger when the first and second rotary members have different rotary speeds, and the electric circuit including a source of power and a reversible electric motor, the reversible electric motor including two windings, each winding being in series with the contact finger and the source of power and one of the contact pieces, and one of the windings driving the motor in one direction when energized and the other winding driving the motor in the other direction when energized.

7. In flow control apparatus, means for producing a stream of flowing material, means for varying the velocity of the stream of flowing material, propeller means in the stream of flowing material, the propeller means having an axis of rotation, and means actuated by variations in the rotational speed of the propeller means about its axis caused by variations in the velocity of the stream of flowing material for operating the means for varying the velocity of the produced stream of flowing material.

ELWIN A. HAWK.

REFERENCES CITED

The following references are of record in the file of this patent:

UNITED STATES PATENTS

| Number | Name | Date |
|---|---|---|
| 1,879,367 | Lotz | Sept. 27, 1932 |
| 2,340,673 | Lotz et al. | Feb. 1, 1944 |